UNITED STATES PATENT OFFICE 2,569,982

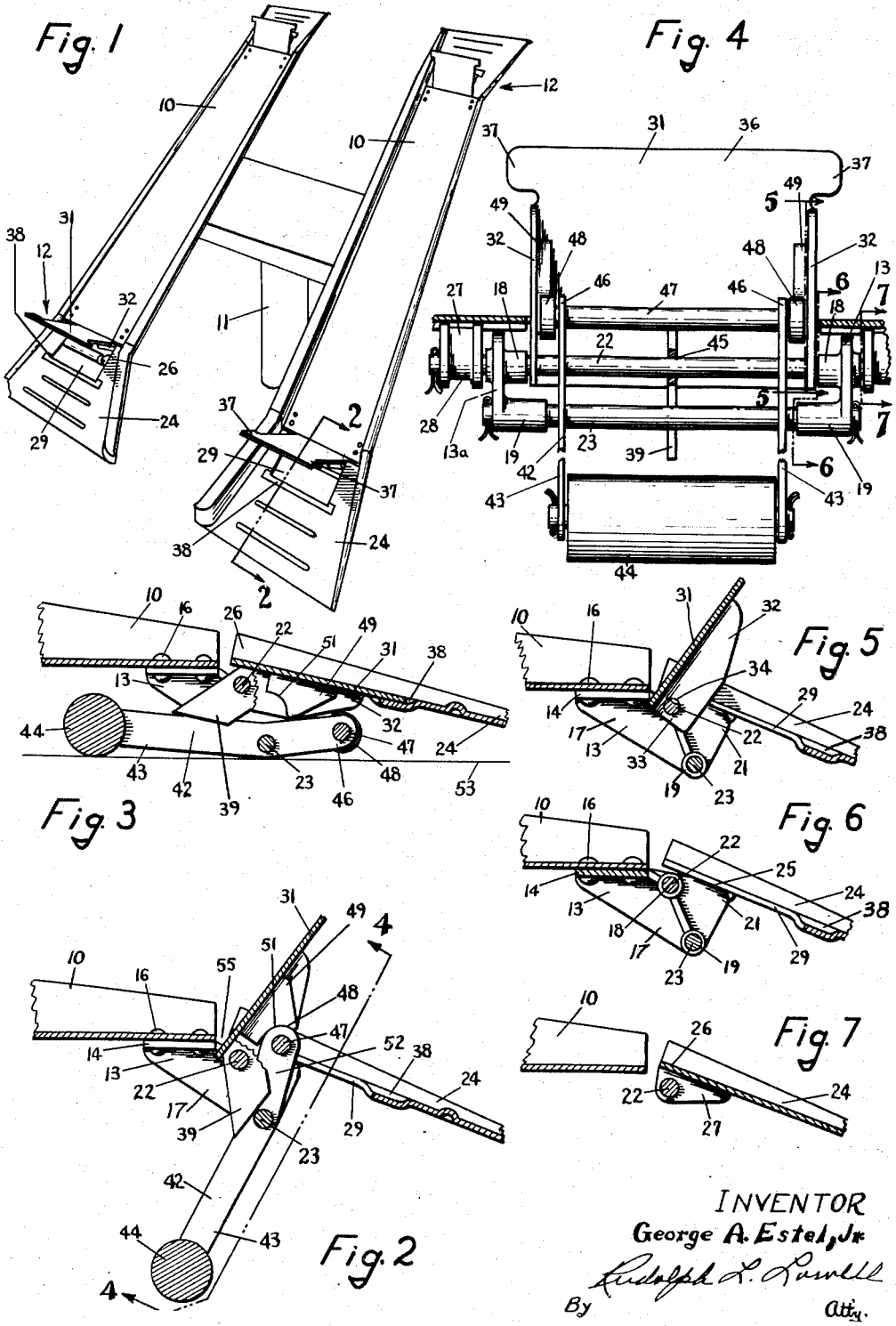

CHOCK MECHANISM FOR VEHICLE LIFTS

George A. Estel, Jr., Des Moines, Iowa, assignor to Globe Hoist Company, Des Moines, Iowa, a corporation of Iowa Application August 3, 1949, Serial No. 108,319

4 Claims. (Cl. 254—89)

This invention relates generally to vehicle lifts and in particular to a chock means for automatically blocking the ends of the vehicle supporting rail in a lift, as the lift is elevated.

An object of this invention is to provide a wheel chock mechanism which is automatically operated in response to the raising and lowering movements of a lift.

Another object of this invention is to provide a gravity-actuated chock mechanism for a vehicle lift in which a pivoted wheel chock member is locked in its chocking position against movement in opposite directions, and released for movement to a non-chocking position in response to the upward movement of a ground engaging counter-weighted arm.

A further object of this invention is to provide a chock mechanism for a vehicle lift; the operating members of which are in open assembly below the chock member and outwardly from the vehicle supporting track so as to be free of any dirt accumulations and in particular of the foreign material removed from a vehicle during body washing and chassis steaming operations.

Yet another object of this invention is to provide a chocking mechanism for a vehicle lift having a track with a hinged ramp, in which a pivot for a pivoted chock member, assembled with the ramp, the pivot for the ramp, and the actuating mechanism for the chock member are located below the chock member and outwardly from the break between the track and the ramp so that washings from the track are permitted to drop directly to the ground without passing over any of the pivots in the chock mechanism.

A feature of this invention is found in the provision of a chock mechanism for a vehicle lift having a vehicle track with a ramp support projected longitudinally from one end thereof. A transverse pivot for a ramp is carried on the support at a position outwardly from the track, with the support being constructed to engage and limit the downward pivotal movement of the ramp. A pivoted chock member has a pivot on the ramp support co-axial with the ramp pivot and is movable to a first position in the plane of the ramp and to a second upright position at the end of the track. A cam on the lower side of the chock member is engageable with a follower at one end of a pivoted actuating arm; a transverse pivot for which arm is carried on the ramp support at a position spaced outwardly and downwardly from the chock pivot. The other end of the arm carries a ground-engaging weight so that as the lift is elevated the follower is moved upwardly against the cam to in turn move the chock to its upright position, which is defined by the engagement of a downwardly projected stop on the chock with the pivot for the actuating arm. At this upright position the follower is received within a recessed portion on the cam, arranged relative to the pivots for the chock and the actuating arm such that the chock is locked against being moved by any pressure exerted thereon by a vehicle wheel. However, as the lift is lowered, and the weighted end of the arm engages the ground, the follower is moved outwardly and downwardly out of the cam recess to permit the pivotal movement of the chock into the plane of the ramp.

Further objects, features and advantages of this invention will become apparent from the following description when taken in connection with the accompanying drawings, in which:

Fig. 1 is a perspective view of a vehicle lift embodying the chock mechanism of this invention, with the chocks being illustrated in wheel-blocking positions;

Fig. 2 is an enlarged foreshortened sectional view of the chock mechanism as seen along the line 2—2 in Fig. 1;

Fig. 3 is a sectional view illustrated similarly to Fig. 2 showing parts of the chock mechanism in changed positions;

Fig. 4 is an enlarged foreshortened sectional view as taken along the line 4—4 in Fig. 2; and Figs. 5, 6 and 7 are sectional detail views taken along the lines 5—5, 6—6 and 7—7, respectively, in Fig. 4.

With reference to Fig. 1 of the drawings, the automatic wheel chock mechanism of this invention is illustrated in assembly with a conventional automobile lift of roll-on type including a pair of longitudinal tracks or runways 10 carried on a plunger 11. The plunger is operated by a suitable means (not shown) to raise and lower the lift.

A chock mechanism of this invention, designated generally at 12 in Fig. 1, is assembled at each end of a wheel supporting track 10. Since each mechanism is of a like construction and similarly assembled on the lift, only one of them will be described in detail.

A chock mechanism 12 includes a pair of supports or mounting brackets 13 and 13a (Figs. 2, 4 and 6) secured to the underside of a track 10 in a transversely spaced relation and projected longitudinally outwardly from an end of the track. Each bracket 13 and 13a includes a horizontal top portion 14 attached by bolts 16 to the track 10, and an upright body member 17 projected downwardly from the horizontal portion 14. Substantially intermediate the ends of a body member 17 are a pair of vertically spaced laterally extended bearing sleeves 18 and 19, with the sleeve 19 being located downwardly and outwardly from the sleeve 18. The brackets 13 and 13a are of a left and right hand type, so that in the assembly of a pair of such brackets on the end of a track 10, the bearing sleeves 18 and 19 on a pair of corresponding brackets 13 and 13a project inwardly toward each other, as best appears in Fig. 4.

The top side of the forward end 21 of a bracket 13 and 13a, and as indicated at 25 in Fig. 6, is inclined downwardly and forwardly for a purpose which will appear later. It will further be noted that the sleeves 18 and 19 are carried in that part of the body member 17 which extends outwardly from the end of the track 10.

The bearing sleeves 18 and 19 in a corresponding pair of brackets 13 and 13a are in co-axial alignment, with a pivot rod 22 (Fig. 4) being carried in the bearings 18 and a pivot rod 23 in the bearings 19. A hinged or pivoted ramp 24 (Figs. 3, 4 and 7) is provided on the under side of its upper end 26 with a pair of transversely spaced mountings 27 integrally formed with sleeve bearings 28. The spacing of the mountings 27 is such that the supporting brackets 13 are receivable therebetween, with the bearings 28 in co-axial alignment with the bearings 18. The pivot rod 22 extends outwardly from the bearings 18 and into the bearings 28 whereby to support the ramp 24 for pivotal up and down movement relative to the brackets 13 and 13a.

The inner end 26 of the ramp 24 is formed with a cut-away portion 29 (Figs. 1 and 2) to receive therein a pivoted chock member 31. The chock member 31 (Figs. 1, 2 and 5) is of a generally flat shape and integrally formed with a pair of transversely spaced downwardly projected side or ear members 32, which are formed adjacent their inner ends 33 with aligned openings 34 for receiving the pivot rod 22. The transverse spacing of the side members 32 is such that they are located between the mounting brackets 13 and 13a.

The outer end 36 of the wheel chock 31 (Fig. 4) is integrally formed with laterally extended projections 37, with this outer end 36 and the projections 37 being receivable within a transverse depression or pocket 38 formed in the outer side wall of the ramp cut-away portion 29. The depression 38 is of a depth such that when the chock end 36 is received therein the chock member 31 is in substantially the plane of the ramp 24. By virtue of the pivoted support of the chock member 31 on the pivot 22, at a position adjacent the inner end of the chock member, it is pivotally movable to a substantially upright position at the end of the track 10. The upright position of the chock member 31 is determined by the engagement of a stop member 39, inclined downwardly from the inner end of the chock, with the pivot rod 23 which pivotally supports a counter-weighted arm structure 42. The stop 39 is located intermediate the sides of the chock member 31, with the pivot rod 22 being inserted through an opening 45 therein (Fig. 4).

The arm structure 42 is comprised of a pair of transversely spaced arm members 43 (Fig. 4) arranged inwardly of the side members 32 of the chock member 31, and pivoted intermediate their ends on the pivot rod 23 which is carried in the sleeve bearings 19. Mounted between the inner ends of the arms 43 is a ground engaging counter-weight 44 of a roller construction. Supported between the outer ends 46 of the arms 43 is a shaft 47 which projects laterally from the arms 43, and has rollers 48 mounted on its projected ends. These rollers or cam followers 48 are engageable with cam members 49 supported from the underside of the wheel chock 31 at positions adjacent to the side members 32 (Figs. 3 and 4). The cams 49 are of a like construction and are formed adjacent their inner ends with pockets or recessed portions 51 for a purpose to appear later.

In the operation of the chock mechanism of this invention, assume that the track 10 is in its lowermost position, illustrated in Fig. 3, with the outer end of the ramp 24 resting upon a ground or floor surface, indicated at 53. At this lowered position of the lift, or track 10, the wheel chock 31 is substantially in the plane of the ramp 24, while the arm structure 42 is extended longitudinally of the track in a substantially horizontal position, and with the roller weight 44 located beneath the track and resting on the ground surface 53.

On elevation of the lift, the arm structure 42 is pivoted in a counter-clockwise direction, as viewed in Fig. 3, by the action of gravity on the weight 44. As a result of this movement, the rollers 48 are moved upwardly into engagement with the cams 49, whereby the wheel chock 31 is pivotally moved from its position shown in Fig. 3 to its upright position shown in Fig. 2. This counter-clockwise movement of the arm structure 42 is limited by the engagement of the stop member 39 with the pivot rod 23 so as to positively lock the chock member 31 against further pivotal movement in a counter-clockwise direction about its pivot 22. With the chock member 31 in an upright position, the rollers 48 are received within the pockets 51 of the cam members 49, and those portions 52 of the arm members 43, located between the pivot rod 23 and the rollers 48, are in substantially upright positions. As a result, any force applied against the wheel chock 31 by a vehicle wheel is incapable of moving the wheel chock 31 toward the ramp 24 by virtue of the substantial vertical alignment of the pivot 23 and the roller shaft 47.

It is seen, therefore, that the wheel chock 31 is positively locked against movement in a counter-clockwise direction about the shaft 22 by the stop member 39 and is releasably locked against movement in a clockwise direction by virtue of the construction of the cam 49, arm structure 42 and their assembly relative to the pivot 23 and roller shaft 47. The downward pivotal movement of the ramp 24 is limited by the engagement of its underside with the top surface portions 25 of the mounting brackets 13 and 13a. (See Fig. 6.)

When the lift is lowered, the weight 44 is initially engaged by the ground surface 53 and the arm structure 42 is pivoted in a clockwise direction about the pivot 23. This pivotal movement is accomplished by virtue of the fact that the weight 44 is located inwardly of the pivot 23 when the chock 31 is in its upright position. As a result of this clockwise movement of the arm structure 42 the rollers 48 are moved outwardly and downwardly out of engagement with the pockets 51 in the cams 49, whereby the chock 31 is permitted to drop by the action of gravity from its upright position shown in Fig. 2 to its position in the plane of the ramp 24, as illustrated in Fig. 3.

With reference to Figs. 2 and 3 it is seen that the construction and relative assembly of the chock mechanism provides for the pivots 22 and 23 being located at all times below the chock member 31 and outwardly from the break or space 55 between the end of the track 10 and the inner end of the ramp 24. Thus any washings or drainage from the track 10, when the lift is in either a lowered or raised position, is permitted to drop to the floor surface 53 without at any time passing over the pivots 22 or 23 or the rollers 49. Further, and from a consideration of Fig. 4, it is seen that the assembly of the chock mechanism is entirely open so as to prevent any dirt or grease accumulations.

From a consideration of the above description it is seen that the invention provides a chock mechanism which is completely automatic in its operation in response to the lowering and raising movements of a lift, and which, in a chocking position, is positively held against movement in a fixed position. However, in response to the engagement of the roller 44 and arm structure 42 with the ground surface 53, the chock member 31 is released for dropping into the plane of the ramp 24 so that in a lowered position of the lift, the chock member offers no obstruction to the passage of a vehicle to and from the tracks 10.

Although the invention has been described with respect to a preferred embodiment thereof, it is to be understood that it is not to be so limited since changes can be made therein which are within the full intended scope of this invention, as defined by the appended claims.

I claim:

1. In a vehicle lift having a track for supporting a vehicle to be elevated and a pivoted ramp, means pivotally supporting said ramp outwardly from one end of said track for up and down pivotal movement, a chock member pivoted on said supporting means for movement about a transverse axis common to said ramp, for pivotal movement into and out of the plane of said ramp, an arm structure extended longitudinally of said track pivoted intermediate the ends thereof on said supporting means for up and down movement, with the pivot for said arm structure being at a position spaced outwardly and downwardly from said common axis so that the outer end of said arm structure is below said chock member and the inner end of said arm structure is below said one end of the track, a weight at the inner end of said arm structure engageable with a ground surface, a cam follower on the outer end of said arm structure, a cam member on the lower side of said chock member having a locking portion thereon, with said cam follower being engageable with said cam member and movable into said locking portion in response to an upward movement of said cam follower, whereby to pivotally raise said chock member upwardly from said ramp, and co-acting stop means on said arm structure pivot and chock member to define a moved position of said cam follower within said cam locking portion.

2. In a vehicle lift having a vehicle supporting track, a mounting bracket supported on said track and projected longitudinally outwardly from one end thereof, a first transverse pivot carried on said bracket outwardly from said one end of the track, a ramp pivotally supported on said transverse pivot, a chock member pivoted on said transverse pivot for up and down movement into and out of the plane of said ramp, a second transverse pivot on said bracket spaced outwardly and downwardly from said first pivot, an arm structure supported intermediate the ends thereof on said second pivot and extended longitudinally of said track so that the outer end of said arm structure is below said chock member and the inner end of said arm structure is below said one end of the track, a ground engaging weight on said inner end of the arm structure, a cam follower on the outer end of said arm structure, a cam member projected downwardly from said chock member and engageable by said cam follower on upward movement of the outer end of said arm structure in response to the action of gravity on the inner end of said arm structure as the lift is elevated, whereby to pivotally raise the chock member out of the plane of said ramp, a locking portion on said cam member for releasably locking said cam follower to hold said chock member against movement into the plane of said ramp, and co-acting means on said chock member and second transverse pivot for limiting the upward movement of said chock member at said locking position of the cam, with said cam follower being released in response to a downward movement of the outer end of said arm structure as effected by the engagement of the inner end of the arm structure with the ground when the lift is lowered.

3. In a vehicle lift having a wheel supporting track and a pivoted ramp extended longitudinally outwardly from one end of the track, an automatic chocking means including a chock member pivotally supported from said track at a position outwardly from said one end of the track for pivotal movement to a first position substantially in the plane of said ramp and to a second substantially upright position, a cam member projected downwardly from said chock member having a locking portion formed thereon, a pivoted arm structure extended longitudinally of said track and supported intermediate the ends thereof from said track so that the outer end of said arm structure is below said chock member and the inner end of said arm structure is below said one end of the track, a ground engaging weight at the inner end of said arm structure, a follower portion at the outer end of said arm structure engageable with said cam in response to an upward movement of the lift, whereby to move said chock member toward said second position therefor, said follower portion at said second position being receivable within said cam locking portion, with the pivot supports for said chock member and arm structure being arranged relative to said cam locking portion such that the chock member in said second position therefor is releasably locked against movement toward said first position therefor, said follower portion being movable out of said locking portion to release said chock member for movement to said first position therefor in response to a downward movement of said follower portion as effected by the engagement of the weighted inner end of said arm structure with the ground when the lift is lowered.

4. In a vehicle lift having a wheel supporting track with a pivoted ramp at one end thereof, an automatic chock means including a pair of transversely spaced brackets secured to the under side of said track and projected longitudinally outwardly from said one end thereof, a transverse pivot for said ramp carried on said brackets outwardly from said one end of the track, a chock member pivotally supported on said pivot for movement to a first position substantially in the plane of said ramp and to a second substantially upright position, a second transverse pivot on said brackets spaced outwardly and downwardly from said first pivot, an arm structure extended longitudinally of said track between said brackets and pivotally supported intermediate the ends thereof on said second pivot for up and down pivotal movement, a weight at the inner end of said arm structure, a cam follower portion on the outer end of said arm structure, a downwardly extended stop member on said chock member engageable with said second pivot to define the second position of said chock member, a cam member on the under side of said chock member having a locking portion formed therein, with said follower portion being engageable with said cam member by the action of gravity on the weighted inner end of said arm structure as the lift is elevated, whereby to move said chock member to said second position therefor, said cam follower portion at said second position of the chock member being receivable in said locking portion to releasably lock said chock member against movement toward said first position therefor, and being movable outwardly from said locking portion in response to the engagement of the weighted inner end of said arm structure with the ground when the lift is lowered.

GEORGE A. ESTEL, JR.

REFERENCES CITED

The following references are of record in the file of this patent:

UNITED STATES PATENTS

| Number | Name | Date |
|---|---|---|
| 1,955,586 | Hott et al. | Apr. 17, 1934 |